United States Patent
Bergner et al.

(10) Patent No.: US 12,459,100 B2
(45) Date of Patent: Nov. 4, 2025

(54) POWER TOOL AND GROMMET

(71) Applicant: HUSQVARNA AB, Huskvarna (SE)

(72) Inventors: Jonas Bergner, Bankeryd (SE); Mikael Evergren, Ulricehamn (SE); Tobias Rydholm, Tenhult (SE); Marcus Pettersson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 401 days.

(21) Appl. No.: 18/075,473

(22) Filed: Dec. 6, 2022

(65) Prior Publication Data
US 2023/0173654 A1 Jun. 8, 2023

(30) Foreign Application Priority Data
Dec. 6, 2021 (SE) .................... 2151483-1

(51) Int. Cl.
  *B25F 5/02* (2006.01)
  *B23D 57/02* (2006.01)
  *B23D 59/00* (2006.01)

(52) U.S. Cl.
  CPC .............. *B25F 5/02* (2013.01); *B23D 57/023* (2013.01); *B23D 59/008* (2013.01)

(58) Field of Classification Search
  CPC ........ B25F 5/02; B23D 57/023; B23D 59/008
  See application file for complete search history.

(56) References Cited

U.S. PATENT DOCUMENTS

| | | | |
|---|---|---|---|
| 6,549,843 B1 * | 4/2003 | Koerner | F02D 41/2422 |
| | | | 123/480 |
| 6,622,681 B2 | 9/2003 | Trumpf et al. | |
| 7,953,543 B2 | 5/2011 | Olsson | |
| 8,482,289 B2 | 7/2013 | Boeker et al. | |
| 9,590,348 B2 | 3/2017 | Grudzewski et al. | |
| 9,665,080 B2 | 5/2017 | Larsson et al. | |

(Continued)

FOREIGN PATENT DOCUMENTS

| | | |
|---|---|---|
| CN | 205480086 U | 8/2016 |
| CN | 206206015 U | 5/2017 |

(Continued)

OTHER PUBLICATIONS

Office Action and Search Report for Swedish Application No. 2151483-1 mailed on Jun. 17, 2022.

*Primary Examiner* — Omar Flores Sanchez
(74) *Attorney, Agent, or Firm* — Burr & Forman

(57) ABSTRACT

The present disclosure relates to a power tool (1) driven by an internal combustion engine and comprising a housing (9) and having a service access interface (11) for connecting to an internal control unit of the engine during service. The access interface (11) comprises a connector (21) and an access interface cable, connecting the connector (21) to the control unit. The housing comprises an opening (15), and a grommet (13) is provided configured to clamp the access interface cable or the connector (21). The grommet (13) is configured to be moved between an operating position and a service position. In the operating position, the grommet (13) is located in the opening (15), the access interface cable and connector (21) being fully enclosed in the housing (9), and in the service position, the grommet (13) is located in said notch, the access interface cable or connector (21) extending through the opening inside the grommet (13).

12 Claims, 3 Drawing Sheets

(56) References Cited

U.S. PATENT DOCUMENTS

| | | | |
|---|---|---|---|
| 2004/0236495 A1 | 11/2004 | Koenen et al. | |
| 2008/0276912 A1 | 11/2008 | Knaub et al. | |
| 2011/0140707 A1 | 6/2011 | Boeker et al. | |
| 2016/0039082 A1* | 2/2016 | Thomas | B25F 5/008 |
| | | | 173/213 |
| 2016/0208685 A1 | 7/2016 | Miyaki et al. | |
| 2019/0254188 A1 | 8/2019 | Cmich et al. | |
| 2019/0255727 A1 | 8/2019 | Wolf et al. | |
| 2020/0030958 A1* | 1/2020 | Chan | B25F 5/02 |
| 2021/0387272 A1* | 12/2021 | Almqvist | B23D 59/02 |
| 2025/0025998 A1* | 1/2025 | Hartmann | B25F 5/02 |

FOREIGN PATENT DOCUMENTS

| | | |
|---|---|---|
| CN | 207882511 U | 9/2018 |
| EP | 3181856 A2 | 6/2017 |
| EP | 3883068 A1 | 9/2021 |
| JP | 2014231743 A | 12/2014 |

\* cited by examiner

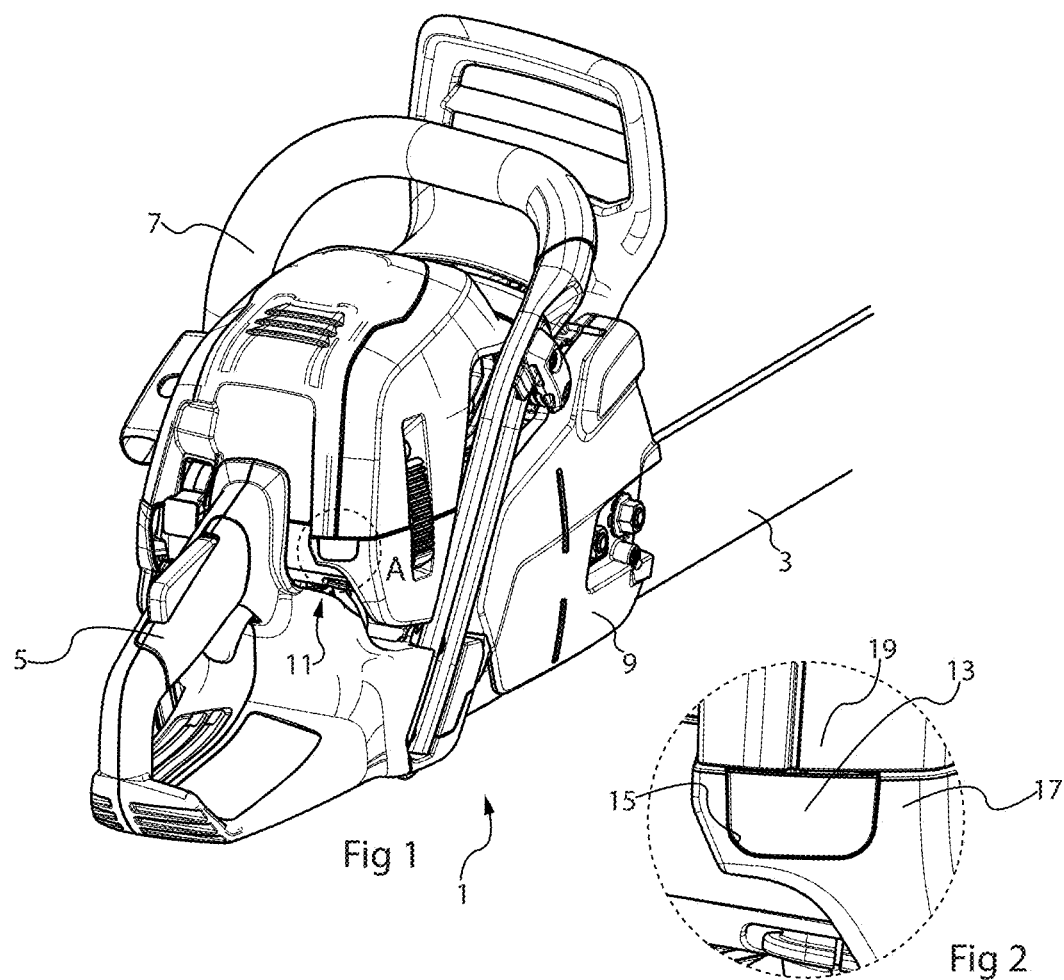
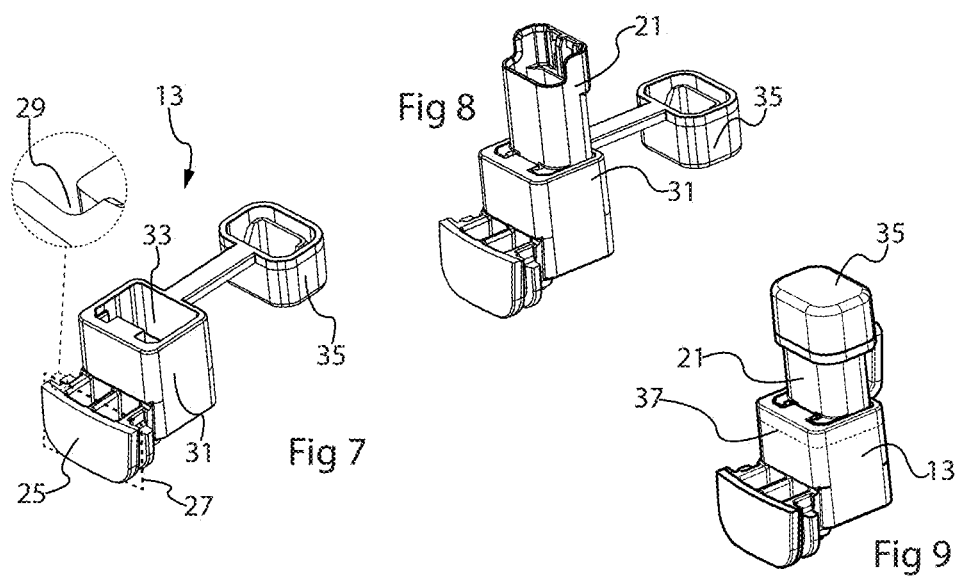

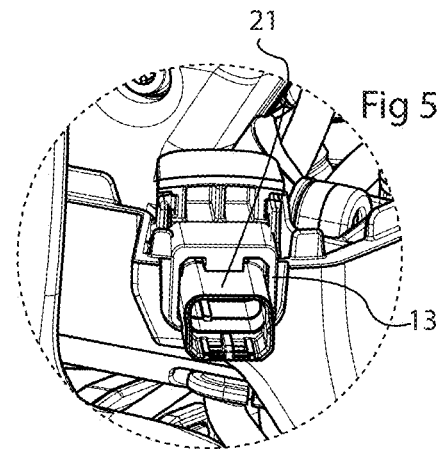
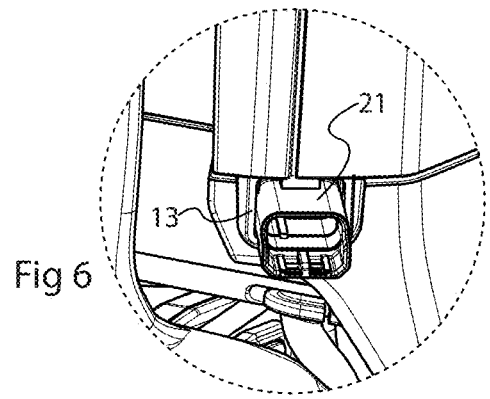
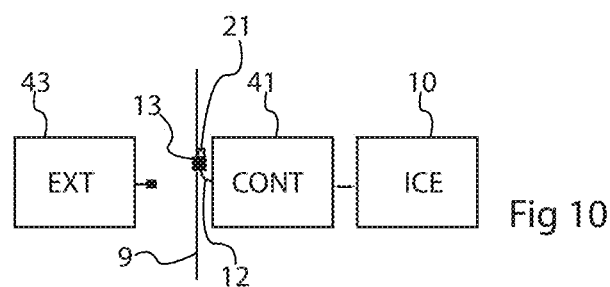
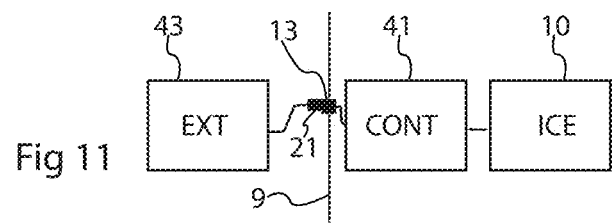

POWER TOOL AND GROMMET

TECHNICAL FIELD

The present disclosure relates to a power tool comprising a housing, an internal combustion engine, an electronic control unit for controlling and/or monitoring the internal combustion engine, the internal combustion engine and the control unit being enclosed in the housing, and a service access interface for connecting to the control unit when servicing the internal combustion engine.

The present disclosure further relates to a grommet for use in a power tool.

BACKGROUND

One example of a power tool with a service access interface used to that end is shown in U.S. Pat. No. 7,809,495-B2 where on a chainsaw an interface is kept available from the outside of the housing.

One potential problem with interfaces of that kind is that they are exposed to the demanding environment surrounding a chainsaw under operation including saw dust, debris, and ice, which may damage or block the interface during long-term use.

SUMMARY

One object of the present disclosure is therefore to provide a power tool with improved long-term reliability. This object is achieved by means of a power tool as defined in claim 1. More specifically, in a power tool of the initially mentioned kind, the access interface comprises a connector and an access interface cable, connecting the connector to the control unit. The housing comprises an opening, and a grommet is provided, configured to clamp the access interface cable or the connector. The grommet is configured to be moveable between an operating position and a service position. In the operating position, the grommet is located in the opening, the access interface cable and connector being fully enclosed in the housing, and, in the service position, the grommet is located in the opening, the access interface cable or connector extending through the opening inside the grommet.

This means that the access interface is given a specific service position where access is facilitated, while during operation the cable and connector are completely enclosed in and protected by the housing while the grommet both keeps the connector in place and is capable to seal the opening to a great extent. This provides a solution with improved reliability.

The housing may comprise at least a first and a second shell part, the opening may be in the form of a notch in an edge of at least one of the first and second shell parts at a shell interface where the first and second shell parts meet. This means that removing one of the shell parts allows the grommet to be moved between the service and operating positions very easily.

The grommet may be made in an elastomer material such as natural rubber or silicone rubber, for instance. It may be oversized in two dimensions with regard to the opening. In this way, the grommet may be compressed when fitted in the opening in the operating position. Thereby, it is kept firmly in place during operation.

A portion of the grommet may be provided with a circumferential groove to fit in the opening with a form-fitting function to make the fastening of the grommet even more reliable.

The grommet may typically be configured to be turned at least 75 degrees, typically about 90 degrees, between the operating position and the service position.

The grommet may be connected with a snap fit on the connector or cable or may alternatively be integrated with the connector or cable, for instance being molded integrally therewith.

The power tool may typically be a chainsaw, although the service access interface of the present disclosure may be used also in other types of tools.

The present disclosure further considers a grommet for a power tool as indicated above. The grommet comprises a retaining part, extending along a first direction, and having an opening for clamping a connector or similar. The retaining part has outer cross-sectional dimensions at a connecting location thereof adapted to fit, in a first position, in an opening in a housing. A front part is provided, protruding from the retaining part in a direction traversing said first direction, at least at a portion of the front part has substantially the same cross-sectional dimensions as the retaining part at the connecting location such that the front part can be fitted in the same opening. This provides a grommet working smoothly in a power tool as described above.

The grommet may comprise a cap, configured to be fitted on a connector or the like when clamped in the retaining part. This provides additional means to protect the connector when not in use.

The front part of the grommet may comprise a circumferential groove for form fitting with the opening.

BRIEF DESCRIPTION OF THE DRAWINGS

FIG. 1 illustrates the rear part of a chainsaw comprising an access interface according to an example of the present disclosure.

FIG. 2 shows enlarged the portion A of FIG. 1.

FIGS. 4-6 illustrate the portion A when an access interface is moved from an operating position to a service position.

FIGS. 7-9 illustrate the grommet when a connector is being attached thereto.

FIGS. 10 and 11 schematically illustrate the operating and service modes.

DETAILED DESCRIPTION

Figure 3:
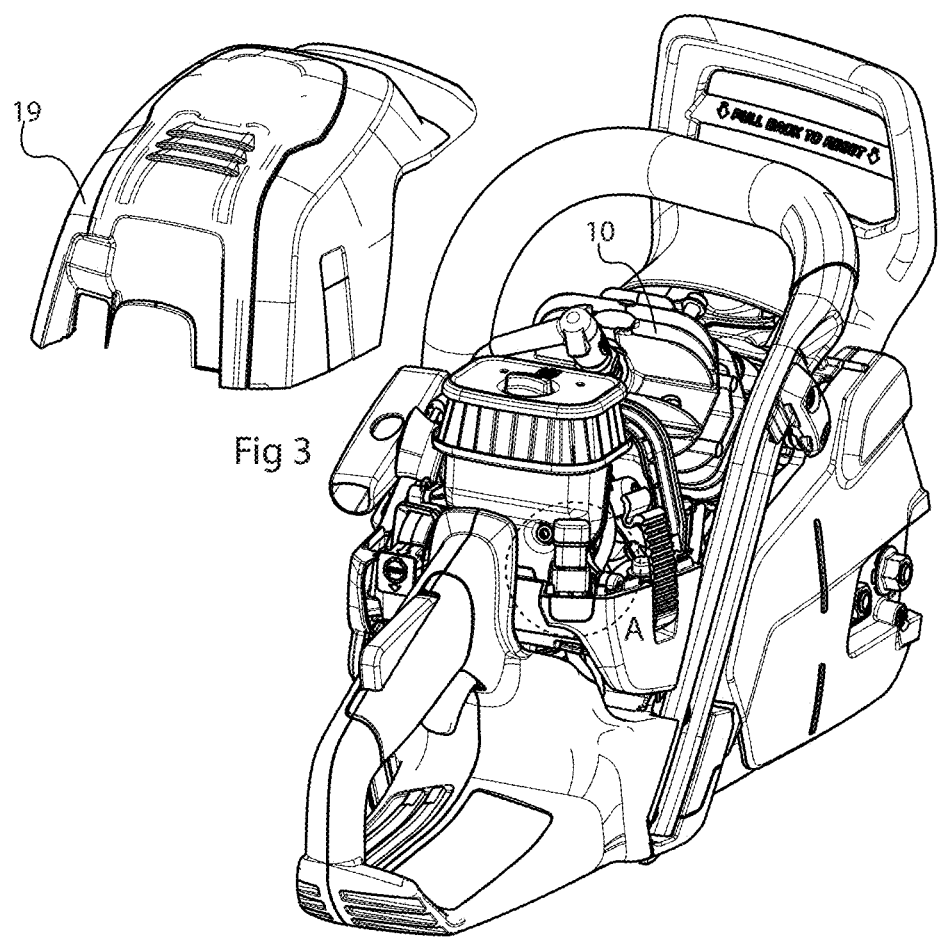
FIG. 3 shows the chainsaw of FIG. 1 with a removed cover.

The present disclosure is concerned with accomplishing an access interface for a chainsaw which is powered by an internal combustion engine, ICE. FIG. 1 shows a chainsaw 1 as seen from the rear thereof. As is common, the chainsaw 1 comprises a cutting part in the form of a guide bar 3 on which a saw chain runs, driven by the ICE while the user maneuvers the chainsaw 1 using its handles 5, 7. A housing 9 encloses the ICE and other internal parts of the chainsaw.

An example of an access interface 11, is indicated in FIG. 1 and in more detail in FIG. 2 showing an enlarged portion A of FIG. 1. In FIGS. 1 and 2, the access interface 11 is in an operating position, which is the intended position when the chain saw is used, and the access interface connector is protected from the environment on the outside of the housing 9.

The access interface 11 comprises an access interface cable and connector, but in the operating position those parts are not visible, being fully enclosed in the housing 9. During operation, i.e. sawing, those parts are therefore protected from the difficult environment experienced during use, often including saw dust and other debris, snow and rain, etc.

FIGS. 1 and 2 show a grommet 13 which is located in an opening in the shape of a notch 15, formed at where two housing parts 17, 19 meet, as will be discussed further. In this position the grommet 13 both seals the inner space of the housing at this location while helping in keeping the inner parts of the access interface in place. The grommet may be made in an elastomer such as for instance natural or silicone rubber and may be squeezed inside the notch 15.

When service is to be carried out, e.g. by authorized service personnel, it may be needed or at least useful to access a control unit inside the housing 9. This may be done to acquire data collected during operation, to set different ICE parameters or to run a test sequence of the ICE where parameters such as ignition timing, fuel, or air flow, etc. are instantaneously measured or controlled. For this reason, the access interface may be set to a service position where the service personnel, for instance, can connect an external measurement or data transfer circuit to the inner control unit.

To move the access interface 11 to the service position, the housing of the chain saw is opened by removing or at least opening a housing part 19, as illustrated in FIG. 3. This exposes the connector 21 as is best seen in the enlarged portion A illustrated also in FIG. 4. The same portion is shown also in FIG. 5 and FIG. 6. In FIG. 5, the grommet 13 is released from the notch 15 and turned about 90 degrees outwards to direct the connector 21 through the notch 15. The grommet 13 is then re-fitted in the notch 15.

Then, as shown in FIG. 6, the housing part 19 is re-assembled on the chainsaw 1, now with the access interface in the service position, the grommet 13 being located in the notch 15, and the access interface connector 21 extending through the notch 15 inside the grommet 13. It is considered an alternative to instead connect the grommet 13 to an access interface cable, which can then extend through the notch 15 in the same way, the connector 21 extending even further out of the housing.

When arranged in this way, service personnel can access the internal control unit and carry out different measurements or control or programming operations. As the housing part 19 is re-fitted risk of injury due to unintentionally touching parts of a running engine 10 can be reduced or eliminated. While removing and subsequently refitting the housing part in this way involves two operations, it does not only reduce or eliminate this risk of injury. It also keeps the access interface much more protected from the operating environment than if it would have been accessible from the outside. While it would be possible to protect a permanently extending part with a plug covering the connector, for instance, such plugs are known to disappear during use. Further, the above outlined approach prevents casual unauthorized access to the access interface which could damage the connector 21 or even the internal control unit. A permanently extending connector could be mistakenly identified as a charger outlet, for instance.

Figure 4:
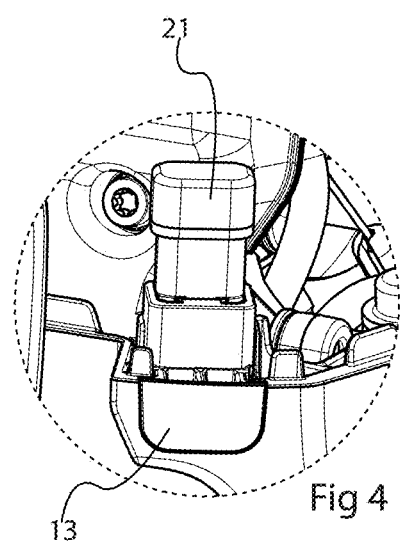

When service has been carried out, the process illustrated in FIGS. 4-6 is reversed. That is, the housing part 19 is again removed, the connector 21 is folded back into the interior, the grommet 13 again being fitted in the notch 15, as shown in FIG. 4, and the housing part 19 is re-fitted a second time. Then, the access interface is back in the operating position, and the chain saw is ready for use.

FIGS. 7-9 illustrate the grommet 13 in greater detail when a connector 21 is attached thereto. FIG. 7 shows the grommet 13 in isolation. The grommet 13 comprises a front part 25, which is intended to be fitted in the opening or notch 15 in the housing, the plane 27 of the notch being indicated in FIG. 7. To make this part fastened safely in the opening or notch, it is possible to make it oversized in two dimensions compared to the notch such that the grommet is compressed when fitted in the notch in the operating position. It is also possible, as illustrated, to provide a circumferential groove 29 in this part to achieve a form-fitting function. This can of course be combined with the oversizing. The grommet may be made in an elastomer material such as natural or silicone rubber, for instance, to provide a substantial sealing function in a compressed state.

Connected to the front part 25 is a connector retaining part 31, through which the connector 21 is intended to extend and to be clamped therein as shown in FIG. 8. This part 31 is thus hollow, and the opening 33 therein is sized such that the connector 21 fits snugly being clamped by the retaining part 31. It is possible to provide a cap 35, connected to the connector retaining part 31, which cap 35 can be fitted over the end of the connector 21 when inserted therein in order to protect the electric interface of the connector 21 even further, as illustrated in FIG. 9. The connector 21 may thus be squeezed into the retaining part during assembling, or a form fitting snap connection may be provided. It would also be possible to integrate the grommet as a whole with the connector or cable, for instance injection moulding the grommet on the connector positioned in a mold.

FIG. 9 also indicates the location 37 of the periphery of the retaining part 31 where it is to be fitted in the notch 15 or opening of the chain saw housing 9. The retaining part 31 thus has a substantially identical cross section extension as the front part 25 at this location 37.

This disclosure thus considers a grommet for a power tool as indicated above. The grommet comprises a retaining part 31, extending along a first direction, and having an opening for clamping a connector 21 or similar. The retaining part has outer cross-sectional dimensions at a connecting location 37 thereof adapted to fit, in a first position, in an opening in a housing, and a front part 25, protruding from the retaining part in a direction traversing the first direction. At least at a portion of the front part has substantially the same cross-sectional dimensions as the retaining part at the connecting location such that the front part can be fitted in the same opening. This provides a grommet working smoothly in a power tool as described above.

In the illustrated case, the front part projects about 90 degrees from the axis of the retaining part 31 along which the connector is inserted, and the grommet is thus turned about 90 degrees between the operating and service positions. While this is advantageous, a smaller angle is possible, e.g. 75 degrees depending on the form of the grommet.

FIGS. 10 and 11 schematically illustrate the operating and service modes. Thus, in the operating mode of FIG. 10, the grommet 13 is in the operating position, and the connector 21 and cable 12 are hidden and protected inside the housing 9. The controller 41 is in an operating mode, controlling and monitoring various aspects of the ICE 10, such as fuel and air flow, ignition timing, temperatures, as a few conceivable examples. When an external unit 43 is to be connected to the control unit 41, the grommet 13 is moved to the service position and the external unit is connected to the connector 21 with a corresponding mating connector, as illustrated in FIG. 11. Then, the controller 41 is in the servicing mode and can carry out various measurements or programming functions in connection with the external unit 43.

The invention is not restricted to the described embodiments and may be varied and altered in different ways within the scope of the appended claims. For instance, while it is shown that the grommet is located in a notch in one of the housing parts, it would be possible to provide notches in both those parts, together accommodating the grommet. It would also be possible to provide an isolated opening in one housing part, i.e., not at an edge, where the grommet can be fitted both in the operating position and in the service position.

The invention claimed is:

1. A power tool comprising a housing, an internal combustion engine, an electronic control unit for controlling and/or monitoring the internal combustion engine, the internal combustion engine and the control unit being enclosed in the housing, and a service access interface for connecting to the control unit when servicing the internal combustion engine,
wherein the access service interface comprises a connector and an access interface cable, connecting the connector to the control unit,
wherein the housing comprising an opening, and
wherein the power tool comprises a grommet configured to clamp the access interface cable or the connector, the grommet being configured to be moveable between an operating position and a service position, wherein
in the operating position, a portion of the grommet is located in said opening, the access interface cable and connector being fully enclosed in the housing, and
in the service position, the grommet is located in said opening, the access interface cable or connector extending through the opening inside the grommet.

2. The power tool according to claim 1, wherein the housing comprises at least a first shell part and a second shell part, the opening comprising a notch in an edge of at least one of the first and second shell parts at a shell interface where the first and second shell parts meet.

3. The power tool according to claim 1, wherein the grommet is made in an elastomer material.

4. The power tool according to claim 3, wherein the grommet is oversized in at least two dimensions with regard to the opening such that the grommet is compressed when fitted in the opening in the operating position.

5. The power tool according to claim 1, wherein a portion of the grommet is provided with a circumferential groove to fit in the opening with a form-fitting function.

6. The power tool according to claim 1, wherein the grommet is configured to be turned at least 75 degrees between the operating position and the service position.

7. The power tool according to claim 1, wherein the grommet is snap fit on the connector or the access interface cable.

8. The power tool according to claim 1, wherein the grommet is integrated with the connector or the access interface cable.

9. The power tool according to claim 1, wherein the power tool is a chainsaw.

10. A grommet for a power tool, comprising a retaining part extending along a first direction and having an opening for clamping a connector, wherein the retaining part has outer cross-sectional dimensions at a connecting location thereof adapted to fit, in a first position, in an opening in a housing, and a front part, protruding from the retaining part in a direction traversing said first direction, at least at a portion of the front part having substantially a same cross-sectional dimensions as the retaining part at said connecting location such that the front part is enabled to be fitted in the same opening.

11. The grommet according to claim 10, further comprising a cap configured to be fitted on the connector when clamped in the retaining part.

12. The grommet according to claim 10, wherein the front part comprises a circumferential groove for form fitting with said opening.

* * * * *